(12) United States Patent
Tokumaru et al.

(10) Patent No.: US 10,053,034 B2
(45) Date of Patent: Aug. 21, 2018

(54) POWER SUPPLY SYSTEM OF VEHICLE

(71) Applicant: MAZDA MOTOR CORPORATION, Hiroshima (JP)

(72) Inventors: Yuichiro Tokumaru, Hiroshima (JP); Masaaki Shimizu, Iwakuni (JP); Osamu Michihira, Hiroshima (JP); Kenji Okada, Higashihiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 745 days.

(21) Appl. No.: 14/592,207

(22) Filed: Jan. 8, 2015

(65) Prior Publication Data

US 2015/0203061 A1 Jul. 23, 2015

(30) Foreign Application Priority Data

Jan. 17, 2014 (JP) .................................. 2014-006443

(51) Int. Cl.
| | |
|---|---|
| *B60L 1/00* | (2006.01) |
| *B60L 3/00* | (2006.01) |
| *H02G 3/00* | (2006.01) |
| *B60R 16/033* | (2006.01) |
| *B60R 16/03* | (2006.01) |

(52) U.S. Cl.
CPC ............ *B60R 16/033* (2013.01); *B60R 16/03* (2013.01)

(58) Field of Classification Search
CPC .............................. B60R 16/03; B60R 16/033
USPC ........................................................ 307/10.1
See application file for complete search history.

(56) References Cited

U.S. PATENT DOCUMENTS

| | | | |
|---|---|---|---|
| 6,396,380 B1* | 5/2002 | Girke ................... | H01H 85/044 337/188 |
| 6,791,207 B2* | 9/2004 | Yoshida .............. | B60R 16/0315 307/10.1 |
| 2007/0146973 A1* | 6/2007 | Leiber ................. | B60R 16/0207 361/641 |

FOREIGN PATENT DOCUMENTS

| | | |
|---|---|---|
| GB | 2 110 891 A | 6/1983 |
| JP | 2000-016200 A | 1/2000 |
| JP | 2000-078746 A | 3/2000 |
| JP | 2005-178778 A | 7/2005 |
| JP | 2005-295768 A | 10/2005 |
| JP | 2008-284980 A | 11/2008 |

* cited by examiner

*Primary Examiner* — Rexford Barnie
*Assistant Examiner* — Toan Vu
(74) *Attorney, Agent, or Firm* — Studebaker & Brackett PC

(57) ABSTRACT

A power supply system comprises an electricity storage device provided at a vehicle's front portion, a front relay device provided at the vehicle's front portion and distributing power to a first electric load including electric loads arranged at the vehicle's front portion, a central relay device provided in a vehicle compartment and distributing power to a second electric load including electric loads arranged in the vehicle compartment, a rear relay device provided at a rear portion of the vehicle and distributing power to a third electric load including electric loads arranged at the vehicle's rear portion, a first power line connecting the electricity storage device and the front relay device, a second power line connecting the front relay device and the central relay device, and a third power line connecting the front relay device and the rear relay device.

3 Claims, 2 Drawing Sheets

POWER SUPPLY SYSTEM OF VEHICLE

BACKGROUND OF THE INVENTION

The present invention relates to a power supply system of a vehicle, such as an automotive vehicle.

Conventionally, in a power supply system for supplying power to plural electric loads (electric devices) arranged at a vehicle, such as an automotive vehicle, a relay device is connected to a battery (electric storage device) by a power line and the electric loads are connected to the relay device by other power lines (distribution power lined), so that power from the battery is distributed to the respective electric loads by way of the relay device. In this case, it has been tried to reduce the number of power lines as disclosed in Japanese Patent Laid-Open Publication Nos. 2008-284098 or 2005-178778. Reduction of the number of power lines causes shortening of the entire length of the power lines and decreasing of the gross weight of the power lines, so that the weight reduction and the cost reduction of the power supply system can be achieved.

Herein, the gross weight of the power lines depends not only on the number of the power lines or the lines' length but on the lines' diameter. Accordingly, in a case in which the power lines having the larger diameter are used in order to achieve the reduction of the number of the power lines, the gross weight of the power lines becomes improperly heavier.

SUMMARY OF THE INVENTION

An object of the present invention is to provide a power supply system of a vehicle which can reduce the gross weight of the power lines surely.

According to the present invention, there is provided a power supply system of a vehicle for supplying power to plural electric loads arranged at the vehicle, comprising an electricity storage device provided at a front portion of the vehicle, a front relay device provided at the front portion of the vehicle and distributing the power to a first electric load including an electric load arranged at the front portion of the vehicle, a central relay device provided in a vehicle compartment and distributing the power to a second electric load including an electric load arranged in the vehicle compartment, a rear relay device provided at a rear portion of the vehicle and distributing the power to a third electric load including an electric load arranged at the rear portion of the vehicle, a first power line connecting the electricity storage device and the front relay device, a second power line connecting the front relay device and the central relay device, and a third power line connecting the front relay device and the rear relay device.

According to the present invention, since the central relay device and the rear relay device are connected to the front relay device by the second power line and the third power line, respectively, the gross weight of the power lines can be lighter compared to, for example, a case in which in order to reduce the number of the power lines, another new branch line is provided to connect to the first power line connecting the electricity storage device and the front relay device, and the central relay device and the rear relay device are connected to this new branch line.

That is, the first power line connected to the electricity storage device allows a large mount of electricity to flow thereon in order to distribute the power to all of the electricity loads, so that the diameter of the first power line may be required to be as large as possible. Accordingly, it may be necessary to set the diameter of the above-described new branch line to be large likewise in order to reduce the number of the power lines as described above. This is because the new branch line having a smaller diameter may cause breaking (i.e., being melt down) of this branch line in a case of a large amount of electricity flowing. Therefore, it may be required in order to reduce the number of the power lines that the central relay device and the rear relay device are connected to the electricity storage device by the power line having an excessively large diameter. This may cause increase of the gross weight of the power lines improperly.

According to the present, however, since the central relay device and the rear relay device are respectively connected to the front relay device by different power lines (the second power line and the third power line), the second power line or the third power line bears its own responsibility of distributing the power for the second electric load or the power for the third electric load. Consequently, the diameter of the second power line or the third power line can be as small as possible. Herein, while the entire length of the power lines becomes longer by the length of the second power line, compared to a case of in which the number of the power lines is reduced as described above, since the diameter of the third power line which is longer than the second power line can be considerably small, the gross weight of the power lines can be lighter surely, so that the weight reduction and the cost reduction of the power supply system can be achieved.

According to an embodiment of the present invention, the power supply system further comprises a first distribution power line connecting the front relay device and the first electric load, a second distribution power line connecting the central relay device and the second electric load, and a third distribution power line connecting the rear relay device and the third electric load, wherein a diameter of the second and third power lines is set to be smaller than that of the first power line, and a diameter of the first, second and third distribution power lines is set to be smaller than the diameter of the second and third power lines.

According to the power supply system of the above-described embodiment, since both the electricity storage device and the front relay device are arranged at the front portion of the vehicle, the length of the first power line can be shorter despite the large diameter of the first power line being configured to allow a large amount of electricity flowing. Further, as described above, the diameter of the second power line or the diameter of the third power line is smaller than the diameter of the first power line. And the diameter of the first-third distribution power lines is set to be much smaller than the diameter of the second power line or the diameter of the third power line. These contribute to the reduction of the gross weight of the power lines, so that the weight reduction and the cost reduction of the power supply system can be achieved more surely.

According to another embodiment of the present invention, the power supply system further comprises a relay device for door which is provided at a door at a side portion of the vehicle and distribute the power to a fourth electric load including an electric load arranged at the door and a fourth power line which connects the central relay device and the relay device for door.

According to the power supply system of the above-described embodiment, since the relay device for door is connected to the central relay device which is positioned closer than the front relay device or the rear relay device, shortening of the entire length of the power lines can be achieved. Further, if the relay device for door is connected to the above-described new branch line in order to reduce the number of the power lines, the diameter of the power line connecting the relay device for door and the electricity storage device may be excessively large. According to this embodiment, however, the fourth power line merely burdens the responsibility of distributing the power for the fourth electric load, its diameter can be as small as possible. Accordingly, even in a case in which the relay device for door for distributing the power to the fourth electric load is arranged at the door, the gross weight of the power lines can be surely lighter, so that the weight reduction and the cost reduction of the power supply system can be achieved.

Other features, aspects, and advantages of the present invention will become apparent from the following description which refers to the accompanying drawings.

DETAILED DESCRIPTION OF THE INVENTION

Hereinafter, a preferred embodiment of the present invention will be described referring to the accompanying drawings.

[Entire Constitution]

Figure 1:
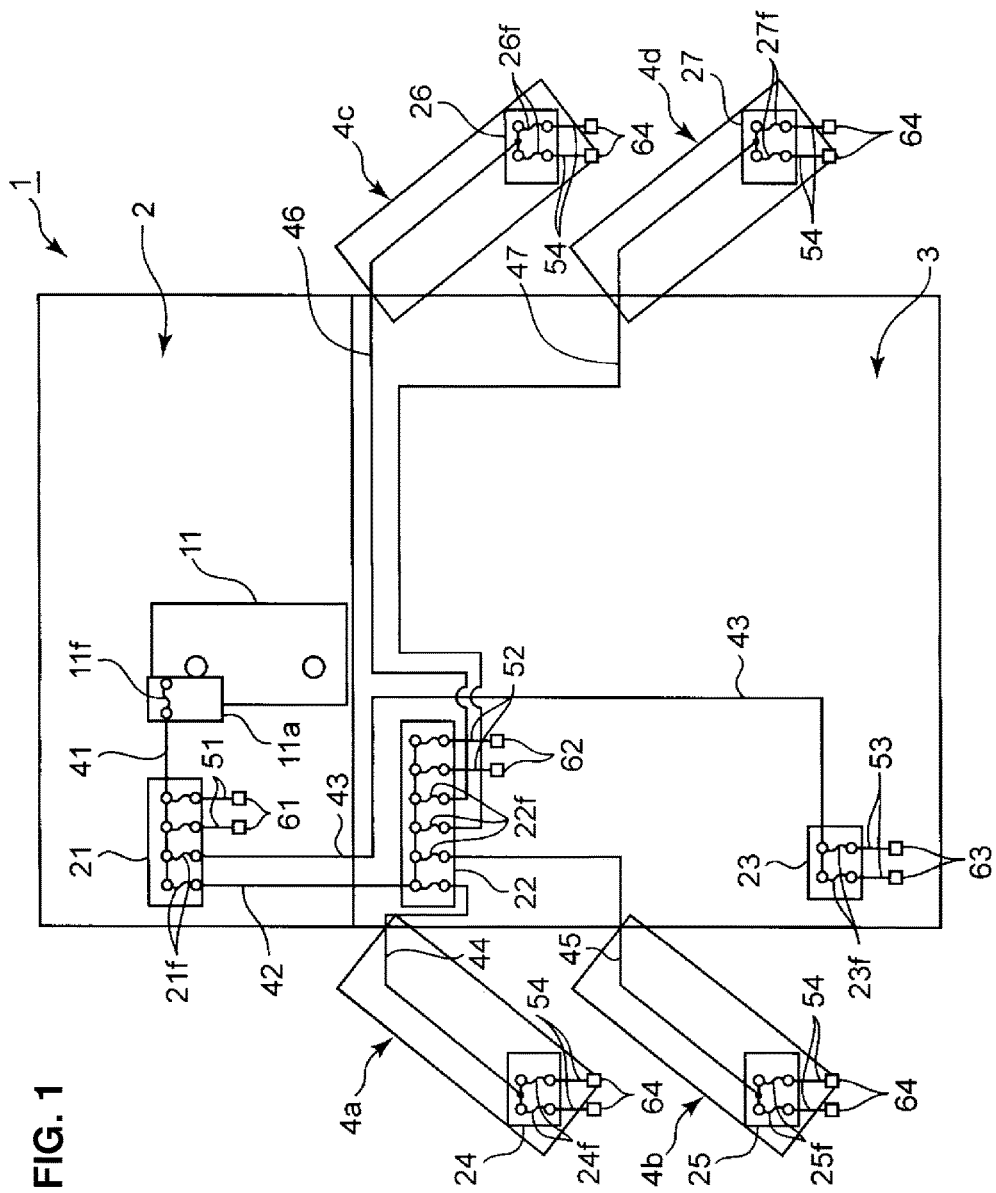
FIG. 1 is an entire constitutional diagram of a power supply system of a vehicle according to the present invention.

FIG. 1 shows an entire constitutional diagram of a power supply system of a vehicle according to the present invention. In FIG. 1, an upper side of the figure shows a front side of a vehicle 1 (which is the same in FIG. 2). In the present embodiment, the power supply device of the present invention is applied to the four-door type of vehicle 1 which has an engine room 2 at its front portion.

That is, the power supply system comprises a battery (electricity storage device) 11, a front relay device 21, a central relay device 22, a rear relay device 23, and relay devices for doors 24-27 as main constitutional elements to supply power (electric power) to plural electric loads (electric devices) 61-64 arranged at the vehicle 1.

The battery 11 is a lead storage battery as a general electricity storage device for vehicle, which is arranged in the engine room 2 at the front portion of the vehicle 1. The battery 11 has a fusible link 11a at a position near its plus terminal, to which a fuse (protecting element) 11f to protect a circuit of the power supply system against an excessive electric current is installed.

The front relay device 21, which distributes the power from the battery 11 to a first electric load 61 including electric loads arranged at the front portion of the vehicle 1, is arranged in the engine room 2 at the front portion of the vehicle 1 similarly to the battery 11. The first electric load 61 includes, for example, a front lamp unit, a front monitoring sensor, fuel injectors and spark plugs of an engine, electromagnetic control valves of a transmission, a windshield wiper, and the like. Fuses 21f to protect internal circuits, the first electric load 61 and others against excessive electric currents are installed to the front relay device 21.

The central relay device 22, which distributes the power from the battery 11 to a second electric load 62 including electric loads arranged in a vehicle compartment 3, is arranged in the vehicle compartment 3, especially at a front portion in the vehicle compartment 3. The second electric load 62 includes, for example, a blower of an air conditioner (HVAS: Heating, Ventilation, and Air Conditioning), power seats, an audio, meters and displays provided at an instrument panel, inside illumination lamps, and the like. Fuses 22f to protect internal circuits, the second electric load 62 and others against excessive electric currents are installed to the central relay device 22.

The rear relay device 23, which distributes the power from the battery 11 to a third electric load 63 including electric loads arranged at the rear portion of the vehicle 1, is arranged at a rear portion of the vehicle 1. The third electric load 63 includes, for example, a rear-window hot (thermal) wire, a rear lamp unit, a rear monitoring sensor, a rear-window wiper, and the like. Fuses 23f to protect internal circuits, the third electric load 63 and others against excessive electric currents are installed to the rear relay device 23.

The relay devices for doors 24-27, which distributes the power from the battery 11 to a fourth electric load 64 including electric loads arranged at side doors 4a-4d of the vehicle 1, are arranged at the respective side doors 4a-4d. The fourth electric load 64 includes, for example, door locks, window regulators, motors for door-mirror adjustment, and the like. Fuses 24f-27f to protect internal circuits, the fourth electric load 64 and others against excessive electric currents are installed to the relay devices for doors 24-27.

Further, power lines to supply the power from the battery 11 to the respective relay devices 21-27 are arranged as below in the present embodiment.

That is, the battery 11 and the front relay device 21 are connected by a first power line 41. The first power line 41 is connected to the fuse 11f of the battery 11 at its one end and to the fuse 21f of the front relay device 21 at its other end.

The front relay device 21 and the central relay device 22 are connected by a second power line 42. The second power line 42 is connected to the fuse 21f of the front relay device 21 at its one end and to the fuse 22f of the central relay device 22 at its other end. The second power line 42 extends in a longitudinal direction of the vehicle 1.

The front relay device 21 and the rear relay device 23 are connected by a third power line 43. The third power line 43 is connected to the fuse 21f of the front relay device 21 at its one end and to the fuse 23f of the rear relay device 23 at its other end. The third power line 43 extends in the longitudinal direction of the vehicle 1, which is longer than the second power line 42.

The central relay device 22 and the relay devices for doors 24-27 are connected by fourth power lines 44-47. The fourth power lines 44-47 are connected to the fuse 22f of the central relay device 22 at their one ends and to the fuses 24f-27f of the relay devices for doors 24-27 at their other ends.

Moreover, different power lines (distribution power lines) to distribute the power supplied to the respective relay devices 21-27 from the battery 11 to the respective relay devices 21-27 are arranged as described below.

That is, the front relay device 21 and the first electric load 61 are connected by a first distribution power line 51. The first distribution power line 51 is connected to the fuse 21f of the front relay device 21 at its one end and to the first electric load 61 at its other end.

The central relay device 22 and the second electric load 62 are connected by a second distribution power line 52. The second distribution power line 52 is connected to the fuse 22f of the central relay device 22 at its one end and to the second electric load 62 at its other end.

The rear relay device 23 and the third electric load 63 are connected by a third distribution power line 53. The third distribution power line 53 is connected to the fuse 23f of the rear relay device 23 at its one end and to the third electric load 63 at its other end.

The relay devices for doors 24-27 and the fourth electric load 64 are connected by a fourth distribution power line 54. The fourth distribution power line 54 is connected to the fuses 24f-27f of the relay devices for doors 24-27 at its one end and to the fourth electric load 64 at its other end.

The first power line 41 connected to the battery 11 has a large diameter, about 20 sq (mm$^2$) for example, which allows a large amount of electricity flowing so as to distribute the power to all of the electric loads 61-64 properly. Herein, since the battery 11 and the front relay device 21 are arranged in the engine room 2 at the vehicle's front portion, the length of the first power line 41 can be as short as possible.

The second power line 42 connected to the central relay device 22 or the third power line connected to the rear relay device 23 distributes only the power for the second electric load 62 or the third electric load 63. Therefore, the diameter of these power lines 42, 43 is set to be smaller than that of the first power line 41. Herein, since the second electric load 62 includes the blower of the air conditioner which has a relatively large amount of electricity flowing or the third electric load 63 includes the rear-window hot wire which has a relatively large amount of electricity flowing, the diameter of these power lines 42, 43 is set at about 5 sq, for example.

Since the fourth power lines 44-47 connected to the relay devices for doors 24-27 distribute only the power for the fourth electric load 64, the diameter of these power lines 44-47 is set at about 1.25 sq, for example.

The respective diameters of the first through fourth distribution power lines 51-54 are set properly according to the respective amounts of electricity flowing for the first through fourth electric loads 61-64. For example, the distribution power line connected to the blower of the air conditioner of the second distribution power line 52 or the distribution power line connected to the rear-widow hot wire of the third distribution power line 53 is set at about 2 sq, for example.

Comparative Example

Figure 2:
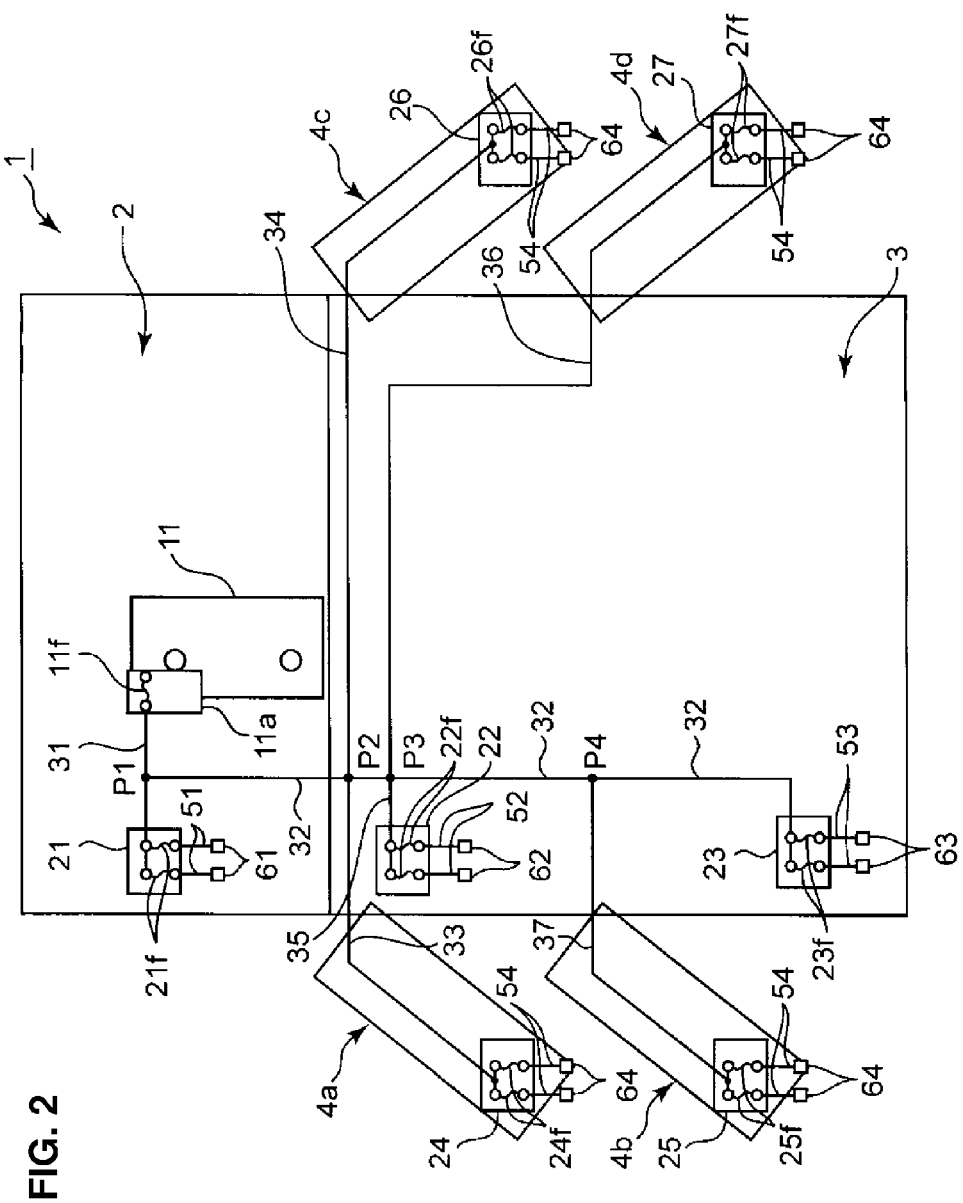
FIG. 2 is an entire constitutional diagram of a power supply system of a vehicle according to a comparative example.

FIG. 2 is an entire constitutional diagram of a power supply system of a vehicle according to a comparative example. The respective constitutions of the battery 11, the front relay device 21, the central relay device 22, the rear relay device 23, and the relay devices for door 24-27 shown in FIG. 2 are the same as those of the present embodiment shown in FIG. 1, but arranging manners of power lines to supply the power from the battery 11 to the respective relay devices 21-27 are different between the both shown in FIGS. 1 and 2. Accordingly, these different points will be described primarily below.

That is, a new power line (branch line) 32 is provided to connect to the first power line 31 connecting the battery 11 and the front relay device 21 at a branch (connecting) point P1. This branch line 32 is configured to extend in the longitudinal direction of the vehicle 1 and connects to the rear relay device 23 at its rear end. Further, new branch lines 33-37 are provided to connect to the above-described branch line 32 at branch (connecting) points P2-P4, respectively. The relay devices for door 24, 26, the central relay device 22, and the relay devices for door 27, 25 are connected to respective end portions of the branch lines 33-37.

Comparison Between Comparative Example and Present Embodiment

Comparing FIG. 1 and FIG. 2, the first power line 31 corresponds to the first power line 41, the branch line 32 corresponds to the third power line 43, the branch line 33 corresponds to the fourth power line 44, the branch line 34 corresponds to the fourth power line 46, the branch line 36 corresponds to the fourth power line 47, and the branch line 37 corresponds to the fourth power line 45. The length of each of the corresponding lines is substantially equal mutually. Meanwhile, while the branch line 35 corresponds to the second power line 42, the length of the branch line 35 is shorter than that of the second power line 42. That is, in the comparative example of FIG. 2, the branch line 32 is provided to connect to the first power line 31 so that the number of the power lines can be reduced.

Herein, since the first power line 31 allows a large amount of electricity flowing so as to distribute the power to all of the electric loads 61-64, its diameter is set at about 20 sq, for example. Accordingly, in the comparative example of FIG. 2, the diameters of the branch lines 32-37 connecting to the first power line 31 are all required to set to be relatively large of about 20 sq in order to prevent the breakage (meltdown). Therefore, the respective relay devices 22-27 are connected to the battery 11 by the power lines having excessively large diameters, so that the gross weight of the power lines may increase improperly because of the above-described reduction of the number of the power lines.

By contrast, while the entire length of the power lines of the present embodiment is longer than that of the comparative example of FIG. 2 by the length of the second power line 42, the gross weight of the power lines can be surely lighter for the reasons that the length of the first power line 41 having the large diameter of about 20 sq can be as short as possible, the diameter of the third power line 43 having the longer length than the second power line 42 can be the minimum small diameter of about 5 sq, the diameters of the fourth power lines 44-47 can be the minimum small diameter of about 1.25 sq, and the like. Consequently, the weight reduction and the cost reduction of the power supply system can be achieved.

That is, the present embodiment attains the minimization of the gross weight of the power lines by making the large-diameter power lines as short as possible and making the small-diameter power lines as long as possible, considering not only the number or the length of the power lines but also the amount of electricity flowing on the power lines or the diameter of the power lines.

[Operations and so On]

As described above, the present embodiment adopts the following characterizing constitution in the power supply system of the vehicle 1 to supply the power to the plural electric loads 61-64 arranged at the vehicle 1.

That is, as shown in FIG. 1, the power supply system comprises the battery 11 which is provided in the engine room 2 at the front portion of the vehicle 1, the front relay device 21 which is provided in the engine room 2 at the front portion of the vehicle 1 and distributes the power to the first electric load 61 including the electric loads arranged at the front portion of the vehicle 1, the central relay device 22 which is provided in the vehicle compartment 3 and distributes the power to the second electric load 62 including the electric loads arranged in the vehicle compartment 3, the rear relay device 23 which is provided at the rear portion of the vehicle 1 and distributes the power to the third electric load 63 including the electric loads arranged at the rear portion of the vehicle 1, the first power line 41 which connects the battery 11 and the front relay device 21, the second power line 42 which connects the front relay device 21 and the central relay device 22, and the third power line 43 which connects the front relay device 21 and the rear relay device 23.

According to the above-described power supply system, since the central relay device 22 and the rear relay device 23 are respectively connected to the front relay device 21 by the second power line 42 and the third power line 43, the gross weight of the power lines can be lighter compared to, for example, a case shown in FIG. 2 in which in order to reduce the number of the power lines, the new power line (branch line) 32 is provided to connect to the first power line 31 connecting the battery 11 and the front relay device 21, and the central relay device 22 and the rear relay device 23 are connected to this new branch line 32. Accordingly, the weight reduction and the cost reduction of the power supply system can be achieved.

Further, in the present embodiment, as shown in FIG. 1, the power supply system further comprises the first distribution power line 51 which connects the front relay device 21 and the first electric load 61, the second distribution power line 52 which connects the central relay device 22 and the second electric load 62, and the third distribution power line 53 which connects the rear relay device 23 and the third electric load 63, wherein the diameter (about 5 sq) of the second and third power lines 42, 43 is set to be smaller than that (about 20 sq) of the first power line 41, and the diameter (about 2 sq at the largest) of the first, second and third distribution power lines 51, 52, 53 is set to be smaller than the diameter of the second and third power lines 42, 43.

According to the present embodiment, since both the battery 11 and the front relay device 21 are arranged at the front portion of the vehicle 1, the length of the first power line 41 can be shorter despite the large diameter of the first power line 41 connecting the battery 11 and the front relay device 21 being configured to allow the large amount of electricity flowing. Further, the diameter of the second power line 42 connecting the front relay device 21 and the central relay device 22 or the diameter of the third power line 43 connecting the front relay device 21 and the rear relay device 23 is smaller than the diameter of the first power line 41. And the diameter of the first-third distribution power lines 51-53 is set to be much smaller than the diameter of the second power line 42 or the diameter of the third power line 43. These contribute to the reduction of the gross weight of the power lines, so that the weight reduction and the cost reduction of the power supply system can be achieved more surely.

Moreover, in the present embodiment, as shown in FIG. 1, the power supply system further comprises the relay devices for doors 24-27 which are provided at the doors 4a-4d at the side portion of the vehicle 1 and distribute the power to the fourth electric load 64 including the electric loads arranged at the doors 4a-4d and the fourth power lines 44-47 which connect the central relay device 22 and the relay devices for doors 24-27.

According to the present embodiment, since the relay devices for doors 24-27 are connected to the central relay device 22 which is positioned closer than the front relay device 21 or the rear relay device 23, shortening of the entire length of the power lines can be achieved. Further, if the relay devices for door 24-27 are connected to the new branch line 32 in order to reduce the number of the power lines as shown in FIG. 2, the diameter of the power line connecting the relay devices for door 24-27 and the battery 11 may be excessively large. According to the present embodiment, however, the fourth power lines 44-47 merely burdens the responsibility of distributing the power for the fourth electric load 64, its diameter can be as small as possible. Accordingly, even in a case in which the relay devices for doors 24-27 for distributing the power to the fourth electric load 64 are arranged at the doors 4a-4d, the gross weight of the power lines can be surely lighter, so that the weight reduction and the cost reduction of the power supply system can be achieved.

The present invention should not be limited to the above-described embodiment, and any other modifications or improvements may be applied within the scope of a sprit of the present invention.

For example, in the above-described embodiment, the electric loads (electric devices) 61-64 are merely exemplified electric loads and therefore the electric load should not be limited to these.

Likewise, the fuses 21f-27f are merely exemplified fuses and therefore the number of the fuses should not be limited to these.

Additionally, the preset invention is applicable to the two-door type of vehicle instated of the four-door type of vehicle.

What is claimed is:

1. A power supply system of a vehicle for supplying electric power to plural electric loads arranged at the vehicle, comprising:
   an electricity storage device provided at a front portion of the vehicle which corresponds to a vehicle space positioned in front of a vehicle compartment;
   a front relay device provided at the front portion of the vehicle which corresponds to the vehicle space positioned in front of the vehicle compartment and distributing the electric power to a first electric load including an electric load arranged at the front portion of the vehicle which corresponds to the vehicle space positioned in front of the vehicle compartment;
   a central relay device provided in the vehicle compartment and distributing the electric power to a second electric load including an electric load arranged in the vehicle compartment;
   a rear relay device provided at a rear portion of the vehicle and distributing the electric power to a third electric load including an electric load arranged at the rear portion of the vehicle;
   a relay device for door which is provided at a door at a side portion of the vehicle and distributes the electric power to a fourth electric load including an electric load arranged at the door;
   a first power line connecting the electricity storage device and the front relay device;
   a second power line directly connecting the front relay device and the central relay device;
   a third power line directly connecting the front relay device and the rear relay device, not connecting said central relay device;
   a fourth power line which connects said central relay device and said relay device for door; and
   a door distribution power line connecting said relay device for door and said fourth electric load including said electric load arranged at the door,
   whereby the electric power supplied from said electricity storage device to said central relay device is conducted through said first power line, said front relay device and said second power line, the electric power supplied from said electricity storage device to said rear relay device is conducted through said first power line, said front relay device and said third power line, not through said second power line nor said central relay device, the electric power supplied from said electricity storage device to said relay device for door is conducted through said first power line, said front relay device, said second power line, said central relay device and said fourth power line, not through said third power line nor said rear relay device, and said relay device for door continuously supplies the electric power to said fourth electric load including said electric load arranged at the door through said door distribution power line while said electricity storage device is supplying the electric power to said relay device for door.

2. The power supply system of the vehicle of claim 1, further comprising a first distribution power line connecting said front relay device and said first electric load, a second distribution power line connecting said central relay device and said second electric load, and a third distribution power line connecting the rear relay device and said third electric load, wherein a diameter of said second and third power lines is set to be smaller than that of said first power line, and a diameter of said first, second and third distribution power lines is set to be smaller than said diameter of the second and third power lines.

3. The power supply system of the vehicle of claim 1, wherein said vehicle space positioned in front of the vehicle compartment is an engine room, so that both said electricity storage device and said front relay device are arranged in the engine room.

\* \* \* \* \*